US011579882B2

(12) United States Patent
Murphy et al.

(10) Patent No.: US 11,579,882 B2
(45) Date of Patent: *Feb. 14, 2023

(54) EXTENDED MEMORY OPERATIONS

(71) Applicant: Micron Technology, Inc., Boise, ID (US)

(72) Inventors: Richard C. Murphy, Boise, ID (US); Glen E. Hush, Boise, ID (US); Vijay S. Ramesh, Boise, ID (US); Allan Porterfield, Durham, NC (US); Anton Korzh, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/212,330

(22) Filed: Mar. 25, 2021

(65) Prior Publication Data

US 2021/0208890 A1 Jul. 8, 2021

Related U.S. Application Data

(63) Continuation of application No. 16/366,774, filed on Mar. 27, 2019, now Pat. No. 10,983,795.

(51) Int. Cl.
*G06F 9/34* (2018.01)
*G06F 3/06* (2006.01)
*G06F 9/24* (2006.01)

(52) U.S. Cl.
CPC ............ *G06F 9/342* (2013.01); *G06F 3/0604* (2013.01); *G06F 3/0659* (2013.01); *G06F 3/0679* (2013.01); *G06F 9/24* (2013.01)

(58) Field of Classification Search
CPC ........ G06F 3/0604; G06F 9/3001; G06F 9/24; G06F 9/342; G06F 3/0659; G06F 3/0679
(Continued)

(56) References Cited

U.S. PATENT DOCUMENTS 5,129,093 A * 7/1992 Muramatsu ............ G06F 15/17
712/28
8,438,455 B2 5/2013 Vogan et al.
(Continued)

OTHER PUBLICATIONS

International Search Report and Written Opinion from related International Application No. PCT/US2020/015293, dated May 21, 2020, 10 pages.

*Primary Examiner* — David Yi
*Assistant Examiner* — Zubair Ahmed
(74) *Attorney, Agent, or Firm* — Brooks, Cameron & Huebsch, PLLC

(57) ABSTRACT

Systems, apparatuses, and methods related to extended memory operations are described. Extended memory operations can include operations specified by a single address and operand and may be performed by a computing device that includes a processing unit and a memory resource. The computing device can perform extended memory operations on data streamed through the computing tile without receipt of intervening commands. In an example, a computing device is configured to receive a command to perform an operation that comprises performing an operation on a data with the processing unit of the computing device and determine that an operand corresponding to the operation is stored in the memory resource. The computing device can further perform the operation using the operand stored in the memory resource.

20 Claims, 9 Drawing Sheets

(58) Field of Classification Search
USPC .......................................................... 711/2, 1
See application file for complete search history.

(56) References Cited

U.S. PATENT DOCUMENTS

| | | |
|---|---|---|
| 9,449,035 B2 | 9/2016 | Grossman et al. |
| 9,477,295 B2 | 10/2016 | Jreji et al. |
| 9,484,103 B1 | 11/2016 | Bruce et al. |
| 2004/0117599 A1 | 6/2004 | Mittal et al. |
| 2010/0017649 A1 | 1/2010 | Wu et al. |
| 2012/0110269 A1 | 5/2012 | Frank |
| 2014/0176187 A1* | 6/2014 | Jayasena ............. G06F 13/1668 |
| | | 326/39 |
| 2015/0371684 A1 | 12/2015 | Mataya |
| 2016/0266848 A1 | 9/2016 | Lam |
| 2018/0307606 A1 | 10/2018 | Ray et al. |
| 2019/0026037 A1 | 1/2019 | Van Lunteren |

\* cited by examiner

750 →

---

RECEIVING, BY A CONTROLLER COUPLED TO A PLURALITY OF COMPUTING DEVICES EACH COUPLED TO ONE ANOTHER AND THAT EACH COMPRISE A PROCESSING UNIT AND A MEMORY ARRAY CONFIGURED AS A CACHE FOR THE PROCESSING UNIT, A COMMAND TO INITIATE PERFORMANCE OF AN OPERATION THAT COMPRISES PERFORMING AN OPERATION ON DATA WITH THE PROCESSING UNIT OF A PARTICULAR COMPUTING DEVICE OF THE PLURALITY OF COMPUTING DEVICES —752

DETERMINING, BY THE CONTROLLER, WHETHER THE PARTICULAR COMPUTING DEVICE AMONG THE PLURALITY OF COMPUTING DEVICES STORES AN OPERAND CORRESPONDING TO THE OPERATION —754

PERFORMING, BY THE PARTICULAR COMPUTING DEVICE, THE OPERATION ON THE DATA —756

*Fig. 7*

United States Patent US 11,579,882 B2

EXTENDED MEMORY OPERATIONS

PRIORITY INFORMATION

This application is a continuation of U.S. application Ser. No. 16/366,774, filed Mar. 27, 2019, the contents of which are incorporated herein by reference.

TECHNICAL FIELD

The present disclosure relates generally to semiconductor memory and methods, and more particularly, to apparatuses, systems, and methods for extended memory operations.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

BRIEF DESCRIPTION OF THE DRAWINGS

FIG. 7 is a flow diagram representing an example method for extended memory operations in accordance with a number of embodiments of the present disclosure.

DETAILED DESCRIPTION

Systems, apparatuses, and methods related to extended memory operations are described. Extended memory operations can include operations specified by a single address and operand and may be performed by a computing device that includes a processing unit and a memory resource. The computing device can perform extended memory operations on data streamed through the computing tile without receipt of intervening commands. In an example, a computing device is configured to receive a command to perform an operation that comprises performing an operation on a data with the processing unit of the computing device and determine that an operand corresponding to the operation is stored in the memory resource. The computing device can further perform the operation using the operand stored in the memory resource.

As used herein, an "extended memory operation" refers to a memory operation that can be specified by a single address (e.g., a memory address) and an operand, such as a 64-bit operand. An operand can be represented as a plurality of bits (e.g., a bit string or string of bits). Embodiments are not limited to operations specified by a 64-bit operand, however, and the operation can be specified by an operand that is larger (e.g., 128-bits, etc.) or smaller (e.g., 32-bits) than 64-bits. As described herein, the effective address space accessible with which to perform extended memory operations is the size of a memory device or file system accessible to a host computing system or storage controller.

Figure 5:
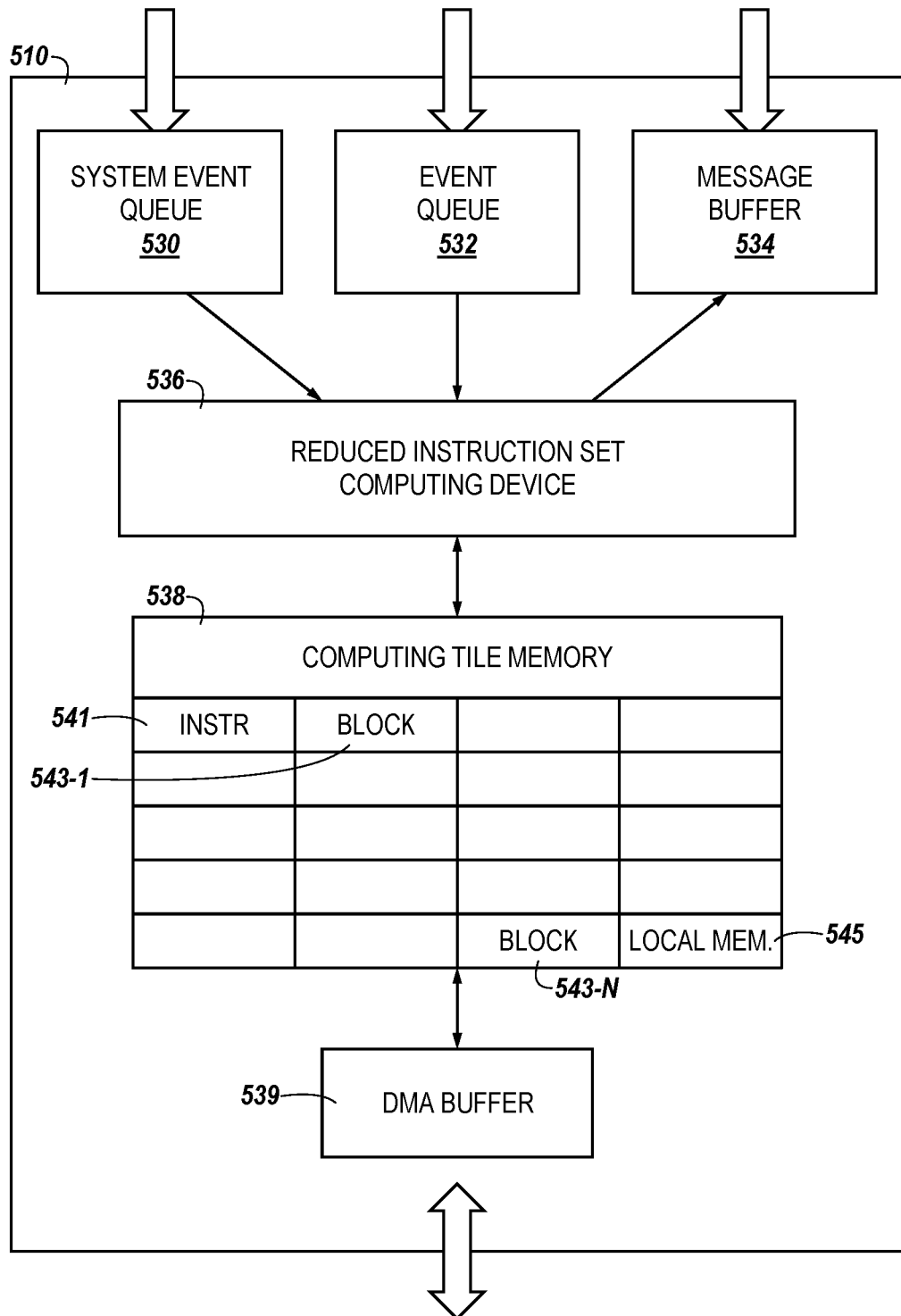
FIG. 5 is a block diagram in the form of a computing tile in accordance with a number of embodiments of the present disclosure.
Figure 6:
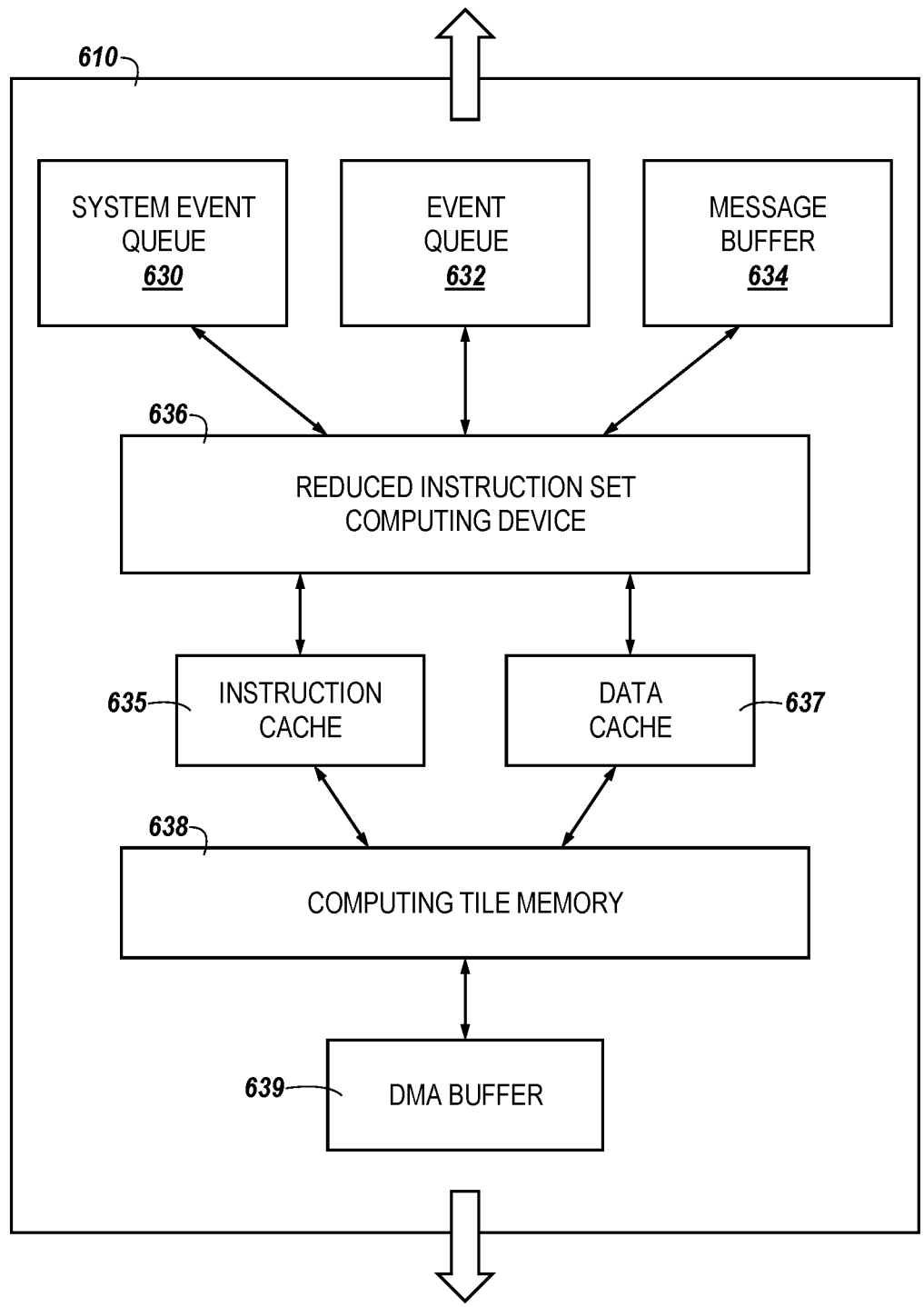
FIG. 6 is another block diagram in the form of a computing tile in accordance with a number of embodiments of the present disclosure.

Extended memory operations can include instructions and/or operations that can be performed by a processing device (e.g., by a processing device such as the reduced instruction set computing device 536/636 illustrated in FIGS. 5 and 6, herein) of a computing tile (e.g., the computing tile(s) 110/210/310/410/510/610 illustrated in FIG. d1-6, herein). In some embodiments, performing an extended memory operation can include retrieving data and/or instructions stored in a memory resource (e.g., the computing tile memory 538/638 illustrated in FIGS. 5 and 6, herein), performing the operation within the computing tile (e.g., without transferring the data or instructions to circuitry external to the computing tile), and storing the result of the extended memory operation in the memory resource of the computing tile or in secondary storage (e.g., in a memory device such as the memory device 116 illustrated in FIG. 1, herein).

Non-limiting examples of extended memory operations can include floating point add accumulate, 32-bit complex operations, square root address (SQRT(addr)) operations, conversion operations (e.g., converting between floating-point and integer formats, and/or converting between floating-point and posit formats), normalizing data to a fixed format, absolute value operations, etc. In some embodiments, extended memory operations can include operations performed by the computing tile that update in place (e.g., in which a result of an extended memory operation is stored at the address in which an operand used in performance of the extended memory operation is stored prior to performance of the extended memory operation), as well as operations in which previously stored data is used to determine a new data (e.g., operations in which an operand stored at a particular address is used to generate new data that overwrites the particular address where the operand was stored).

As a result, in some embodiments, performance of extended memory operations can mitigate or eliminate locking or mutex operations, because the extended memory operation(s) can be performed within the computing tile, which can reduce contention between multiple thread execution. Reducing or eliminating performance of locking or mutex operations on threads during performance of the extended memory operations can lead to increased performance of a computing system, for example, because extended memory operations can be performed in parallel within a same computing tile or across two or more of the computing tiles that are in communication with each other. In addition, in some embodiments, extended memory operations described herein can mitigate or eliminate locking or mutex operations when a result of the extended memory operation is transferred from the computing tile that performed the operation to a host.

Memory devices may be used to store important or critical data in a computing device and can transfer such data between a host associated with the computing device. However, as the size and quantity of data stored by memory devices increases, transferring the data to and from the host can become time consuming and resource intensive. For example, when a host requests performance of memory operations using large blocks of data, an amount of time and/or an amount of resources consumed in obliging the request can increase in proportion to the size and/or quantity of data associated with the blocks of data.

As storage capability of memory devices increases, these effects can become more pronounced as more and more data are able to be stored by the memory device and are therefore available for use in memory operations. In addition, because data may be processed (e.g., memory operations may be performed on the data), as the amount of data that is able to be stored in memory devices increases, the amount of data that may be processed can also increase. This can lead to increased processing time and/or increased processing resource consumption, which can be compounded in performance of certain types of memory operations. In order to alleviate these and other issues, embodiments herein can allow for extended memory operations to be performed using a memory device, one or more computing tiles, and/or memory array(s).

In some approaches, performing memory operations can require multiple clock cycles and/or multiple function calls to memory of a computing system such as a memory device and/or memory array. In contrast, embodiments herein can allow for performance of extended memory operations in which a memory operation is performed with a single function call or command. For example, in contrast to approaches in which at least one command and/or function call is utilized to load data to be operated upon and then at least one subsequent function call or command to store the data that has been operated upon is utilized, embodiments herein can allow for performance of memory operations in the absence of at least one function call or command.

By reducing the number of function calls and/or commands utilized in performance of memory operations, an amount of time consumed in performing such operations and/or an amount of computing resources consumed in performance of such operations can be reduced in comparison to approaches in which multiple function calls and/or commands are required for performance of memory operations. Further, embodiments herein can reduce movement of data within a memory device and/or memory array because data may not need to be loaded into a specific location prior to performance of memory operations. This can reduce processing time in comparison to some approaches, especially in scenarios in which a large amount of data is subject to a memory operation.

Further, extended memory operations described herein can allow for a much larger set of type fields in comparison to some approaches. For example, an instruction executed by a host to request performance of an operation using data in a memory device (e.g., a memory sub-system) can include a type, an address, and a data field. The type can correspond to the particular operation being requested, the address can correspond to an address in which data to be used in performance of the operation is stored, and the data field can correspond to the data (e.g., an operand) to be used in performing the operation. In some approaches, type fields can be limited to different size reads and/or writes, as well as some simple integer accumulate operations. In contrast, embodiments herein can allow for a broader spectrum of type fields to be utilized because the effective address space that can be used when performing extended memory operations can correspond to a size of the memory device. By extending the address space available to perform operations, embodiments herein can therefore allow for a broader range of type fields and, therefore, a broader spectrum of memory operations can be performed than in approaches that do not allow for an effective address space that is the seize of the memory device.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "X," "Y," "N," "M," "A," "B," "C," "D," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 110-1, 110-2, . . . , 110-N may be referred to generally as 110. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
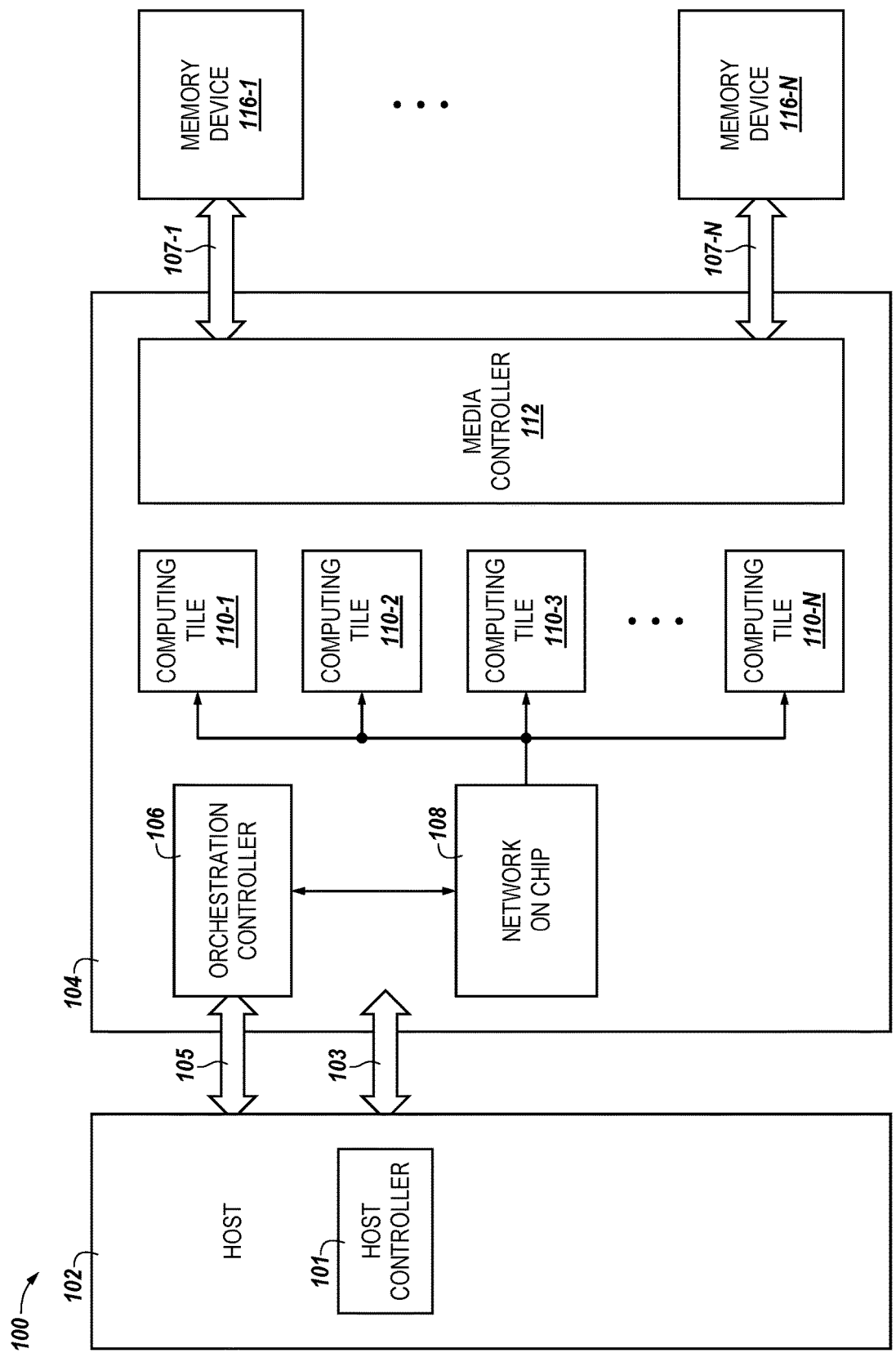
FIG. 1 is a functional block diagram in the form of a computing system including an apparatus including a storage controller and a number of memory devices in accordance with a number of embodiments of the present disclosure.

FIG. 1 is a functional block diagram in the form of a computing system 100 including an apparatus including a storage controller 104 and a number of memory devices 116-1, . . . , 116-N in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1, memory devices 116-1 . . . 116-N can include a one or more memory modules (e.g., single in-line memory modules, dual in-line memory modules, etc.). The memory devices 116-1, . . . , 116-N can include volatile memory and/or non-volatile memory. In a number of embodiments, memory devices 116-1, . . . , 116-N can include a multi-chip device. A multi-chip device can include a number of different memory types and/or memory modules. For example, a memory system can include non-volatile or volatile memory on any type of a module.

The memory devices 116-1, . . . , 116-N can provide main memory for the computing system 100 or could be used as additional memory or storage throughout the computing system 100. Each memory device 116-1, . . . , 116-N can include one or more arrays of memory cells, e.g., volatile and/or non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

In embodiments in which the memory devices 116-1, . . . , 116-N include non-volatile memory, the memory devices 116-1, . . . , 116-N can be flash memory devices such as NAND or NOR flash memory devices. Embodiments are not so limited, however, and the memory devices 116-1, . . . , 116-N can include other non-volatile memory devices such as non-volatile random-access memory devices (e.g., NVRAM, ReRAM, FeRAM, MRAM, PCM), "emerging" memory devices such as 3-D Crosspoint (3D XP) memory devices, etc., or combinations thereof. A 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation, where a non-volatile memory cell can be programmed without the non-volatile memory cell being previously erased.

As illustrated in FIG. 1, a host 102 can be coupled to a storage controller 104, which can in turn be coupled to the memory devices 116-1 . . . 116-N. In a number of embodiments, each memory device 116-1 . . . 116-N can be coupled to the storage controller 104 via a channel (e.g., channels 107-1, . . . , 107-N). In FIG. 1, the storage controller 104, which includes an orchestration controller 106, is coupled to the host 102 via channel 103 and the orchestration controller 106 is coupled to the host 102 via a channel 105. The host 102 can be a host system such as a personal laptop computer, a desktop computer, a digital camera, a smart phone, a memory card reader, and/or internet-of-thing enabled device, among various other types of hosts, and can include a memory access device, e.g., a processor (or processing device). One of ordinary skill in the art will appreciate that "a processor" can intend one or more processors, such as a parallel processing system, a number of coprocessors, etc.

The host 102 can include a system motherboard and/or backplane and can include a number of processing resources (e.g., one or more processors, microprocessors, or some other type of controlling circuitry). In some embodiments, the host 102 can include a host controller 101, which can be configured to control at least some operations of the host 102 and/or the storage controller 104 by, for example, generating and transferring commands to the storage controller to cause performance of operations such as extended memory operations. The host controller 101 can include circuitry (e.g., hardware) that can be configured to control at least some operations of the host 102 and/or the storage controller 104. For example, the host controller 101 can be an application specific integrated circuit (ASIC), a field programmable gate array (FPGA), or other combination of circuitry and/or logic configured to control at least some operations of the host 102 and/or the storage controller 104.

The system 100 can include separate integrated circuits or the host 102, the storage controller 104, the orchestration controller 106, the network-on-chip (NoC) 108, and/or the memory devices 116-1, . . . , 116-N can be on the same integrated circuit. The system 100 can be, for instance, a server system and/or a high performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

The storage controller 104 can include an orchestration controller 106, a network on a chip (NoC) 108, a plurality of computing tiles 110-1, . . . , 110-N, which are described in more detail in connection with FIGS. 5 and 6, herein, and a media controller 112. The plurality of computing tiles 110 may be referred to herein as "computing devices." The orchestration controller 106 (or, for simplicity, "controller") can include circuitry and/or logic configured to allocate and de-allocate resources to the computing tiles 110-1, . . . , 110-N during performance of operations described herein. For example, the orchestration controller 106 can allocate and/or de-allocate resources to the computing tiles 110-1, . . . , 110-N during performance of extended memory operations described herein. In some embodiments, the orchestration controller 106 can be an application specific integrated circuit (ASIC), a field programmable gate array (FPGA), or other combination of circuitry and/or logic configured to orchestrate operations (e.g., extended memory operations) performed by the computing tiles 110-1, . . . , 110-N. For example, the orchestration controller 106 can include circuitry and/or logic to control the computing tiles 110-1, . . . , 110-N to perform operations on blocks of received data to perform extended memory operations on data (e.g., blocks of data).

The orchestration controller 106 can be configured to request a block of data from one or more of the memory devices 116-1, . . . , 116-N and cause the computing tiles 110-1, . . . , 110-N to perform an operation (e.g., an extended memory operation) on the block of data. The operation may be performed to evaluate a function that can be specified by a single address and one or more operands associated with the block of data. The orchestration controller 106 can be further configured to cause a result of the extended memory operation to be stored in one or more of the computing tiles 110-1, . . . , 110-N and/or to be transferred to an interface (e.g., communication paths 103 and/or 105) and/or the host 102.

In some embodiments, the orchestration controller 106 can be one of the plurality of computing tiles 110. For example, the orchestration controller 106 can include the same or similar circuitry that the computing tiles 110-1, . . . , 110-N include, as described in more detail in connection with FIG. 4B, herein. However, in some embodiments, the orchestration controller 106 can be a distinct or separate component from the computing tiles 110-1, . . . , 110-N, and may therefore include different circuitry than the computing tiles 110, as shown in FIG. 1.

The NoC 108 can be a communication subsystem that allows for communication between the orchestration controller 106 and the computing tiles 110-1, . . . , 110-N. The NoC 108 can include circuitry and/or logic to facilitate the communication between the orchestration controller 106 and the computing tiles 110-1, . . . , 110-N. In some embodiments, as described in more detail in connection with FIG. 2, herein, the NoC 108 can receive an output (e.g., data on which an extended memory operation has been performed) from the computing tiles 110-1, . . . , 110-N and transfer the output from the computing tiles 110-1, . . . , 110-N to the orchestration controller 106 and/or the host 102, and vice versa. For example, the NoC 108 may be configured to receive data that has been subjected to an extended memory operation by the computing tiles 110-1, . . . , 110-N and transfer the data that corresponds to the result of the extended memory operation to the orchestration controller 106 and/or the host 102. In some embodiments, as described in more detail in connection with FIG. 4B, herein, the NoC 108 can include at least a portion of the orchestration controller 106. For example, the NoC 108 can include the circuitry that comprises the orchestration controller 106, or a portion thereof.

Although a NoC 108 is shown in FIG. 1, embodiments are not limited to utilization of a NoC 108 to provide a communication path between the orchestration controller 106 and the computing tiles 110-1, . . . , 110-N. For example, other communication paths such as a storage controller crossbar (XBAR) may be used to facilitate communication between the computing tiles 110-1, . . . , 110-N and the orchestration controller 106.

The media controller 112 can be a "standard" or "dumb" media controller. For example, the media controller 112 can be configured to perform simple operations such as copy, write, read, error correct, etc. for the memory devices 116-1, . . . , 116-N. However, in some embodiments, the media controller 112 does not perform processing (e.g., operations to manipulate data) on data associated with the memory devices 116-1, . . . , 116-N. For example, the media controller 112 can cause a read and/or write operation to be performed to read or write data from or to the memory devices 116-1, . . . , 116-N via the communication paths 107-1, . . . , 107-N, but the media controller 112 may not perform processing on the data read from or written to the memory devices 116-1, . . . , 116-N. In some embodiments, the media controller 112 can be a non-volatile media controller, although embodiments are not so limited.

The embodiment of FIG. 1 can include additional circuitry that is not illustrated so as not to obscure embodiments of the present disclosure. For example, the storage controller 104 can include address circuitry to latch address signals provided over I/O connections through I/O circuitry. Address signals can be received and decoded by a row decoder and a column decoder to access the memory devices 116-1, . . . , 116-N. It will be appreciated by those skilled in the art that the number of address input connections can depend on the density and architecture of the memory devices 116-1, . . . , 116-N.

In some embodiments, extended memory operations can be performed using the computing system 100 shown in FIG. 1 by selectively storing or mapping data (e.g., a file) into a computing tile 110. The data can be selectively stored in an address space of the computing tile memory (e.g., in a portion such as the block 543-1 of the computing tile memory 538 illustrated in FIG. 5, herein). In some embodiments, the data can be selectively stored or mapped in the computing tile 110 in response to a command received from the host 102 and/or the orchestration controller 106. In embodiments in which the command is received from the host 102, the command can be transferred to the computing tile 110 via an interface (e.g., communication paths 103 and/or 105). The interface(s) 103/105 can be peripheral component interconnect express (PCIe) buses, double data rate (DDR) interfaces, or other suitable interfaces or buses. Embodiments are not so limited, however, and in embodiments in which the command is received by the computing tile from the orchestration controller 106, the command can be transferred directly from the orchestration controller 106, or via the NoC 108.

In a non-limiting example in which the data (e.g., in which data to be used in performance of an extended memory operation) is mapped into the computing tile 110, the host controller 101 can transfer a command to the computing tile 110 to initiate performance of an extended memory operation using the data mapped into the computing tile 110. In some embodiments, the host controller 101 can look up an address (e.g., a physical address) corresponding to the data mapped into the computing tile 110 and determine, based on the address, which computing tile (e.g., the computing tile 110-1) the address (and hence, the data) is mapped to. The command can then be transferred to the computing tile (e.g., the computing tile 110-1) that contains the address (and hence, the data).

In some embodiments, the data can be a 64-bit operand, although embodiments are not limited to operands having a specific size or length. In an embodiment in which the data is a 64-bit operand, once the host controller 101 transfers the command to initiate performance of the extended memory operation to the correct computing tile (e.g., the computing tile 110-1) based on the address at which the data is stored, the computing tile (e.g., the computing tile 110-1) can perform the extended memory operation using the data.

In some embodiments, the computing tiles 110 can be separately addressable across a contiguous address space, which can facilitate performance of extended memory operations as described herein. That is, an address at which data is stored, or to which data is mapped, can be unique for all the computing tiles 110 such that when the host controller 101 looks up the address, the address corresponds to a location in a particular computing tile (e.g., the computing tile 110-1).

For example, a first computing tile (e.g., the computing tile 110-1) can have a first set of addresses associated therewith, a second computing tile (e.g., the computing tile 110-2) can have a second set of addresses associated therewith, a third computing tile (e.g., the computing tile 110-3) can have a third set of addresses associated therewith, through the n-th computing tile (e.g., the computing tile 110-N), which can have an n-th set of addresses associated therewith. That is, the first computing tile 110-1 can have a set of addresses 0000000 to 0999999, the second computing tile 110-2 can have a set of addresses 1000000 to 1999999, the third computing tile 110-3 can have a set of addresses 2000000 to 2999999, etc. It will be appreciated that these address numbers are merely illustrative, non-limiting, and can be dependent on the architecture and/or size (e.g., storage capacity) of the computing tiles 110.

As a non-limiting example in which the extended memory operation comprises a floating-point-add-accumulate operation (FLOATINGPOINT_ADD_ACCUMULATE), the computing tiles 110 can treat the destination address as a floating-point number, add the floating-point number to the argument stored at the address of the computing tile 110, and store the result back in the original address. For example, when the host controller 101 (or the orchestration controller 106) initiates performance of a floating-point add accumulate extended memory operation, the address of the computing tile 110 that the host looks up (e.g., the address in the computing tile to which the data is mapped) can be treated as a floating-point number and the data stored in the address can be treated as an operand for performance of the extended memory operation. Responsive to receipt of the command to initiate the extended memory operation, the computing tile 110 to which the data (e.g., the operand in this example) is mapped can perform an addition operation to add the data to the address (e.g., the numerical value of the address) and store the result of the addition back in the original address of the computing tile 110.

As described above, performance of such extended memory operations can, in some embodiments require only a single command (e.g., request command) to be transferred from the host 102 (e.g., from the host controller 101) to the memory device 104 or from the orchestration controller 106 to the computing tile(s) 110. In contrast to some previous approaches, this can reduce an amount of time, for example, for multiple commands to traverse the interface(s) 103/105 and/or for data, such as operands to be moved from one address to another within the computing tile(s) 110.

In addition, performance of extended memory operations in accordance with the disclosure can further reduce an amount of processing power or processing time since the data mapped into the computing tile 110 in which the extended memory operation is performed can be utilized as an operand for the extended memory operation and/or the address to which the data is mapped can be used as an operand for the extended memory operation, in contrast to approaches in which the operands must be retrieved and loaded from different locations prior to performance of operations. That is, at least because embodiments herein allow for loading of the operand to be skipped, performance of the computing system 100 may be improved in comparison to approaches that load the operands and subsequently store a result of an operations performed between the operands.

Further, in some embodiments, because the extended memory operation can be performed within a computing tile 110 using the address and the data stored in the address and, in some embodiments, because the result of the extended memory operation can be stored back in the original address, locking or mutex operations may be relaxed or not required during performance of the extended memory operation. Reducing or eliminating performance of locking or mutex operations on threads during performance of the extended memory operations can lead to increased performance of the computing system 100 because extended memory operations can be performed in parallel within a same computing tile 110 or across two or more of the computing tiles 110.

In some embodiments, valid mappings of data in the computing tiles 110 can include a base address, a segment size, and/or a length. The base address can correspond to an address in the computing tile 110 in which the data mapping is stored. The segment size can correspond to an amount of data (e.g., in bytes) that the computing system 100 can process, and the length can correspond to a quantity of bits corresponding to the data. It is noted that, in some embodiments, the data stored in the computing tile(s) 110 can be uncacheable on the host 102. For example, the extended memory operations can be performed entirely within the computing tiles 110 without encumbering or otherwise transferring the data to or from the host 102 during performance of the extended memory operations.

In a non-limiting example in which the base address is 4096, the segment size is 1024, and the length is 16,386, a mapped address, 7234, may be in a third segment, which can correspond to a third computing tile (e.g., the computing tile 110-3) among the plurality of computing tiles 110. In this example, the host 102, the orchestration controller 106, and/or the NoC 108 can forward a command (e.g., a request) to perform an extended memory operation to the third computing tile 110-3. The third computing tile 110-3 can determine if data is stored in the mapped address in a memory (e.g., a computing tile memory 538/638 illustrated in FIGS. 5 and 6, herein) of the third computing tile 110-3. If data is stored in the mapped address (e.g., the address in the third computing tile 110-3), the third computing tile 110-3 can perform a requested extended memory operation using that data and can store a result of the extended memory operation back into the address in which the data was originally stored.

In some embodiments, the computing tile 110 that contains the data that is requested for performance of an extended memory operation can be determined by the host controller 101, the orchestration controller 106, and/or the NoC 108. For example, portion of a total address space available to all the computing tiles 110 can be allocated to each respective computing tile. Accordingly, the host controller 101, the orchestration controller 106, and/or the NoC 108 can be provided with information corresponding to which portions of the total address space correspond to which computing tiles 110 and can therefore direct the relevant computing tiles 110 to perform extended memory operations. In some embodiments, the host controller 101, the orchestration controller 106, and/or the NoC 108 can store addresses (or address ranges) that correspond to the respective computing tiles 110 in a data structure, such as a table, and direct performance of the extended memory operations to the computing tiles 110 based on the addresses stored in the data structure.

Embodiments are not so limited, however, and in some embodiments, the host controller 101, the orchestration controller 106, and/or the NoC 108 can determine a size (e.g., an amount of data) of the memory resource(s) (e.g., each computing tile memory 538/638 illustrated in FIGS. 5 and 6, herein) and, based on the size of the memory resource(s) associated with each computing tile 110 and the total address space available to all the computing tiles 110, determine which computing tile 110 stores data to be used in performance of an extended memory operation. In embodiments in which the host controller 101, the orchestration controller 106, and/or the NoC 108 determine the computing tile 110 that stores the data to be used in performance of an extended memory operation based on the total address space available to all the computing tiles 110 and the amount of memory resource(s) available to each computing tile 110, it can be possible to perform extended memory operations across multiple non-overlapping portions of the computing tile memory resource(s).

Continuing with the above example, if there is not data in the requested address, the third computing tile 110-3 can request the data as described in more detail in connection with FIGS. 2, 3, 4A-4C, 5, and 6, herein, and perform the extended memory operation once the data is loaded into the address of the third computing tile 110-3. In some embodiments, once the extended memory operation is completed by the computing tile (e.g., the third computing tile 110-3 in this example), the orchestration controller 106 and/or the host 102 can be notified and/or a result of the extended memory operation can be transferred to the orchestration controller 106 and/or the host 102.

Figure 2:
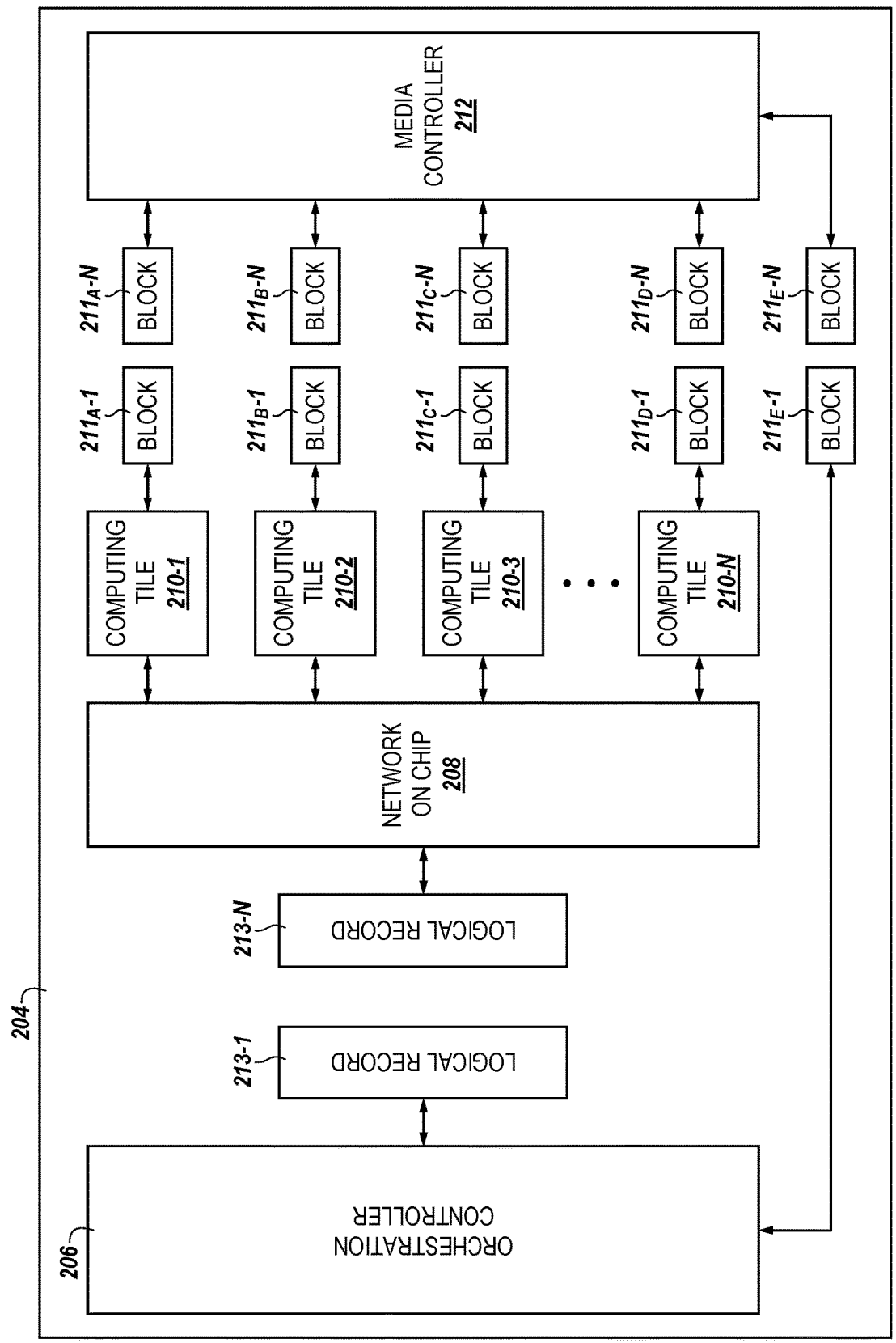
FIG. 2 is a functional block diagram in the form of an apparatus including a storage controller in accordance with a number of embodiments of the present disclosure.

FIG. 2 is a functional block diagram in the form of an apparatus including a storage controller 204 in accordance with a number of embodiments of the present disclosure. The storage controller 204 can be analogous to the storage controller 104 illustrated in FIG. 1. As shown in FIG. 2, the storage controller 204 can include a media controller 212, a plurality of computing tiles 210-1, ..., 210-N, a network on chip (NoC) 208, and an orchestration controller 206.

The media controller 212 can be configured to retrieve blocks of data $211_A$-1, ..., $211_A$-N, $211_B$-1, ..., $211_B$-N, $211_C$-1, ..., $211_C$-N, $211_D$-1, ..., $211_D$-N, $211_E$-1, ..., $211_E$-N from a memory device (e.g., memory device(s) 116-1, ..., 116-N illustrated in FIG. 1) coupled to the storage controller 204 in response to a request from the orchestration controller 206 or a host, such as the host 102 illustrated in FIG. 1. The media controller can subsequently cause the blocks of data $211_A$-1, ..., $211_A$-N, $211_B$-1, ..., $211_B$-N, $211_C$-1, ..., $211_C$-N, $211_D$-1, ..., $211_D$-N, $211_E$-1, ..., $211_E$-N to be transferred to the computing tiles 210-1, ..., 210-N and/or the orchestration controller 206.

Similarly, the media controller 212 can be configured to receive blocks of data $211_A$-1, ..., $211_A$-N, $211_B$-1, ..., $211_B$-N, $211_C$-1, ..., $211_C$-N, $211_D$-1, ..., $211_D$-N, $211_E$-1, ..., $211_E$-N from the computing tiles 210 and/or the orchestration controller 206. The media controller can subsequently cause the blocks of data $211_A$-1, ..., $211_A$-N, $211_B$-1, ..., $211_B$-N, $211_C$-1, ..., $211_C$-N, $211_D$-1, ..., $211_D$-N, $211_E$-1, ..., $211_E$-N to be transferred to a memory device coupled to the storage controller 204.

The blocks of data 211 can be approximately 4 kilobytes in size (although embodiments are not limited to this particular size) and can be processed in a streaming manner by the computing tiles 210-1, ..., 210-N in response to one or more commands generated by the orchestration controller 206 and/or a host. In some embodiments, the blocks of data 211 can be 32-bit, 64-bit, 128-bit, etc. words or chunks of data, and/or the blocks of data 211 can correspond to operands to be used in performance of an extended memory operation.

For example, as described in more detail in connection with FIGS. 5 and 6, herein, because the computing tiles 210 can perform an extended memory operation (e.g., process) a second block of data 211 in response to completion of performance of an extended memory operation on a preceding block of data 211, the blocks of data 211 can be continuously streamed through the computing tiles 210 while the blocks of data 211 are being processed by the computing tiles 210. In some embodiments, the blocks of data 211 can be processed in a streaming fashion through the computing tiles 210 in the absence of an intervening command from the orchestration controller 206 and/or the host. That is, in some embodiments, the orchestration controller 206 (or host) can issue a command to cause the computing tiles 210 to process blocks of data 211 received thereto and blocks of data 211 that are subsequently received by the computing tiles 210 can be processed in the absence of an additional command from the orchestration controller 206.

In some embodiments, processing the blocks 211 of data can include performing an extended memory operation using the blocks of data 211. For example, the computing tiles 210-1, ..., 211-N can, in response to commands from the orchestration controller 206, perform extended memory operations the blocks of data 211 to evaluate one or more functions, remove unwanted data, extract relevant data, or otherwise use the blocks of data 211 in connection with performance of an extended memory operation.

In a non-limiting example in which the data (e.g., in which data to be used in performance of an extended memory operation) is mapped into one or more of the computing tiles 210, the orchestration controller 206 can transfer a command to the computing tile 206 to initiate performance of an extended memory operation using the data mapped into the computing tile(s) 210. In some embodiments, the orchestration controller 206 can look up an address (e.g., a physical address) corresponding to the data mapped into the computing tile(s) 210 and determine, based on the address, which computing tile (e.g., the computing tile 210-1) the address (and hence, the data) is mapped to. The command can then be transferred to the computing tile (e.g., the computing tile 210-1) that contains the address (and hence, the data). In some embodiments, the command can be transferred to the computing tile (e.g., the computing tile 210-1) via the NoC 208.

The orchestration controller 206 (or a host) can be further configured to send commands to the computing tiles 210-1, ..., 210-N to allocate and/or de-allocate resources available to the computing tiles 210-1, ..., 210-N for use in performing extended memory operations using the blocks of data 211. In some embodiments, allocating and/or de-allocating resources available to the computing tiles 210-1, ..., 210-N can include selectively enabling some of the computing tiles 210 while selectively disabling some of the computing tiles 210. For example, if less than a total number of computing tiles 210 are required to process the blocks of data 211, the orchestration controller 206 can send a command to the computing tiles 210 that are to be used for processing the blocks of data 211 to enable only those computing tiles 210 desired to process the blocks of data 211.

The orchestration controller 206 can, in some embodiments, be further configured to send commands to synchronize performance of operations, such as extended memory operations, performed by the computing tiles 210. For example, the orchestration controller 206 (and/or a host) can send a command to a first computing tile (e.g., the computing tile 210-1) to cause the first computing tile to perform a first extended memory operation, and the orchestration controller 206 (or the host) can send a command to a second computing tile (e.g., the computing tile 210-2) to perform a second extended memory operation using the second computing tile. Synchronization of performance of operations, such as extended memory operations, performed by the computing tiles 210 by the orchestration controller 206 can further include causing the computing tiles 210 to perform particular operations at particular time or in a particular order.

As described above, data that results from performance of an extended memory operation can be stored in the original address in the computing tile 210 in which the data was stored prior to performance of the extended memory operation, however, in some embodiments, blocks of data that result from performance of the extended memory operation can be converted into logical records 213-1, . . . , 213-N subsequent to performance of the extended memory operation. The logical records 213 can comprise data records that are independent of their physical locations. For example, the logical records 213 may be data records that point to an address (e.g., a location) in at least one of the computing tiles 210 where physical data corresponding to performance of the extended memory operation is stored.

As described in more detail in connection with FIGS. 5 and 6, herein, the result of the extended memory operation can be stored in an address of a computing tile memory (e.g., the computing tile memory 538 illustrated in FIG. 5 or the computing tile memory 638 illustrated in FIG. 6) that is the same as the address in which the data is stored prior to performance of the extended memory operation. Embodiments are not so limited, however, and the result of the extended memory operation can be stored in an address of the computing tile memory that is the same as the address in which the data is stored prior to performance of the extended memory operation In some embodiments, the logical records 213 can point to these address locations such that the result(s) of the extended memory operation can be accessed from the computing tiles 210 and transferred to circuitry external to the computing tiles 210 (e.g., to a host).

In some embodiments, the orchestration controller 206 can receive and/or send blocks of data $211_E$-1, . . . , $211_E$-N directly to and from the media controller 212. This can allow the orchestration controller 206 to transfer blocks of data $211_E$-1, . . . , $211_E$-N that are not processed (e.g., blocks of data that are not used in performance of extended memory operations) by the computing tiles 210 to and from the media controller 212.

For example, if the orchestration controller 206 receives unprocessed blocks of data $211_E$-1, . . . , $211_E$-N from a host (e.g., the host 102 illustrated in FIG. 1) coupled to the storage controller 204 that are to be stored by memory device(s) (e.g., the memory devices 116 illustrated in FIG. 1) coupled to the storage controller 204, the orchestration controller 206 can cause the unprocessed blocks of data $211_E$-1, . . . , $211_E$-N to be transferred to the media controller 212, which can, in turn, cause the unprocessed blocks of data $211_E$-1, . . . , $211_E$-N to be transferred to memory device(s) coupled to the storage controller 204.

Similarly, if the host requests an unprocessed (e.g., a full) block of data (e.g., a block of data that is not processed by the computing tiles 210), the media controller 212 can cause full blocks of data $211_E$-1, . . . , $211_E$-N to be transferred to the orchestration controller 206, which can subsequently transfer the unprocessed blocks of data $211_E$-1, . . . , $211_E$-N to the host.

Figure 3:
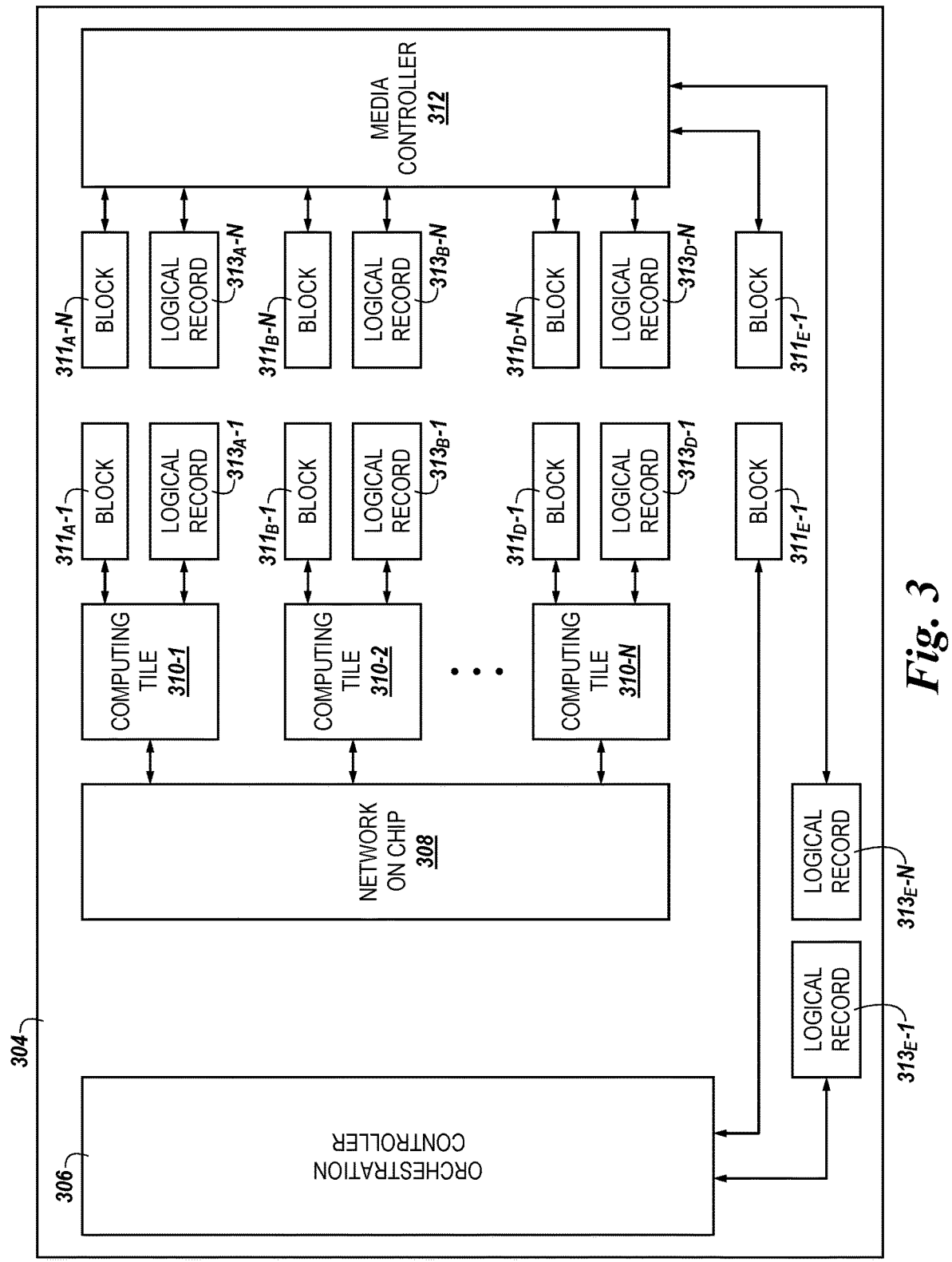
FIG. 3 is another functional block diagram in the form of an apparatus including a storage controller in accordance with a number of embodiments of the present disclosure.

FIG. 3 is another functional block diagram in the form of an apparatus including a storage controller 304 in accordance with a number of embodiments of the present disclosure. The storage controller 304 can be analogous to the storage controller 104 illustrated in FIG. 1 or the storage controller 204 illustrated in FIG. 2, herein. As shown in FIG. 3, the storage controller 304 can include a media controller 312, a plurality of computing tiles 310-1, . . . , 310-N, a network on chip (NoC) 308, and an orchestration controller 306.

The media controller 312 can be configured to retrieve blocks of data $311_A$-1, . . . , $311_A$-N, $311_B$-1, . . . , $311_B$-N, $311_C$-1, . . . , $311_C$-N, $311_D$-1, . . . , $311_D$-N, $311_E$-1, . . . , $311_E$-N and/or logical records $313_A$-1, . . . , $313_A$-N, $313_B$-1, . . . , $313_B$-N, $313_C$-1, . . . , $313_C$-N, $313_D$-1, . . . , $313_D$-N, $313_E$-1, . . . , $313_E$-N from a memory device (e.g., memory device(s) 116-1, . . . , 116-N illustrated in FIG. 1) coupled to the storage controller 304 in response to a request from the orchestration controller 306. The media controller can subsequently cause the blocks of data $311_A$-1, . . . , $311_A$-N, $311_B$-1, . . . , $311_B$-N, $311_C$-1, . . . , $311_C$-N, $311_D$-1, . . . , $311_D$-N, $311_E$-1, . . . , $311_E$-N and/or logical records $313_A$-1, . . . , $313_A$-N, $313_B$-1, . . . , $313_B$-N, $313_C$-1, . . . , $313_C$-N, $313_D$-1, . . . , $313_D$-N, $313_E$-1, . . . , $313_E$-N to be transferred to the computing tiles 310-1, . . . , 310-N and/or the orchestration controller 306.

Similarly, the media controller 312 can be configured to receive blocks of data $311_A$-1, . . . , $311_A$-N, $311_B$-1, . . . , $311_B$-N, $311_C$-1, . . . , $311_C$-N, $311_D$-1, . . . , $311_D$-N, $311_E$-1, . . . , $311_E$-N and/or logical records $313_A$-1, . . . , $313_A$-N, $313_B$-1, . . . , $313_B$-N, $313_C$-1, . . . , $313_C$-N, $313_D$-1, . . . , $313_D$-N, $313_E$-1, . . . , $313_E$-N from the computing tiles 310 and/or the orchestration controller 306. The media controller can subsequently cause the blocks of data $311_A$-1, . . . , $311_A$-N, $311_B$-1, . . . , $311_B$-N, $311_C$-1, . . . , $311_C$-N, $311_D$-1, . . . , $311_D$-N, $311_E$-1, . . . , $311_E$-N and/or logical records $313_A$-1, . . . , $313_A$-N, $313_B$-1, . . . , $313_B$-N, $313_C$-1, . . . , $313_C$-N, $313_D$-1, . . . , $313_D$-N, $313_E$-1, . . . , $313_E$-N to be transferred to a memory device coupled to the storage controller 304.

The blocks of data 311 can be approximately 4 kilobytes in size and can be processed in a streaming manner by the computing tiles 310-1, . . . , 310-N in response to one or more commands generated by the orchestration controller 306 and/or a host. In some embodiments, the blocks of data 311 can be 32-bit, 64-bit, 128-bit, etc. words or chunks of data, and/or the blocks of data 311 can correspond to operands to be used in performance of an extended memory operation. In some embodiments, processing the blocks 311 of data can include performing an extended memory operation using the blocks of data 311. For example, the computing tiles 310-1, . . . , 310-N can, in response to commands from the orchestration controller 306 and/or a host, perform extended memory operations on the blocks of data 311. For example, the computing tiles 310-1, . . . , 310-N can, in response to commands from the orchestration controller 306 and/or a host, process blocks of data 311, generate logical records 313, and/or transfer the logical records to a location external to the computing tiles 310.

Figure 4A:
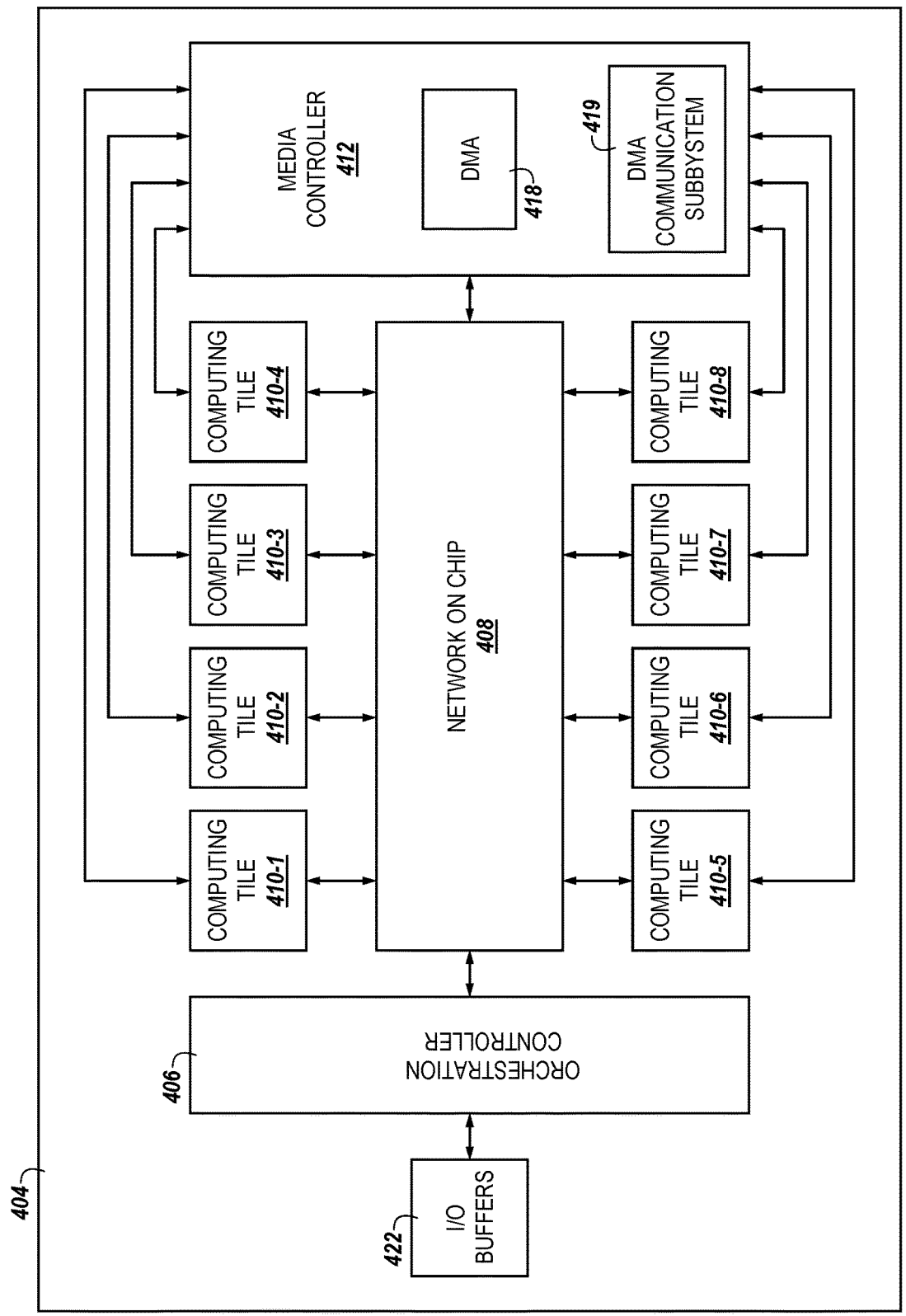
FIG. 4A is yet another functional block diagram in the form of an apparatus including a storage controller in accordance with a number of embodiments of the present disclosure.
Figure 4B:
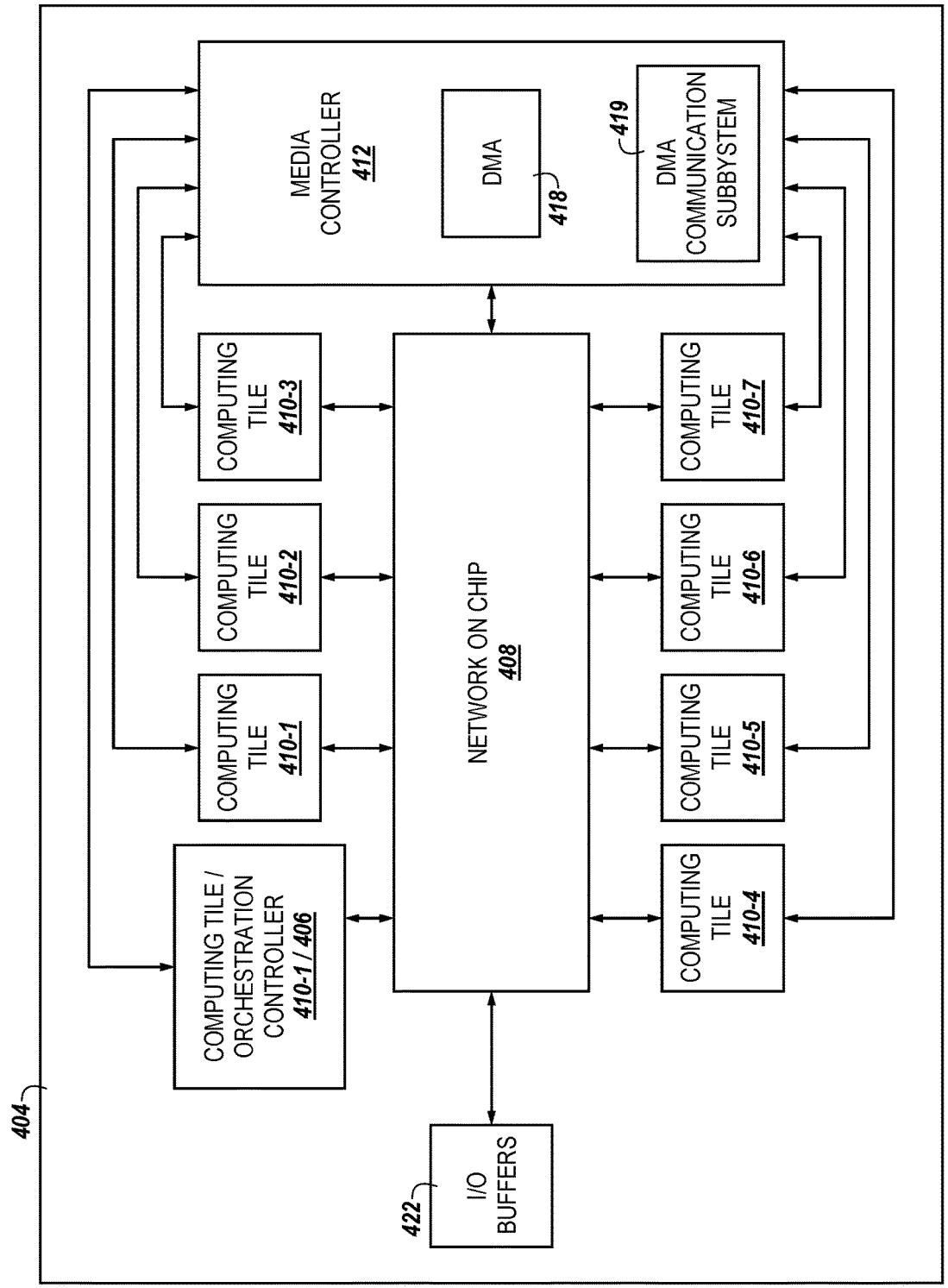
FIG. 4B is yet another functional block diagram in the form of an apparatus including a storage controller in accordance with a number of embodiments of the present disclosure.
Figure 4C:
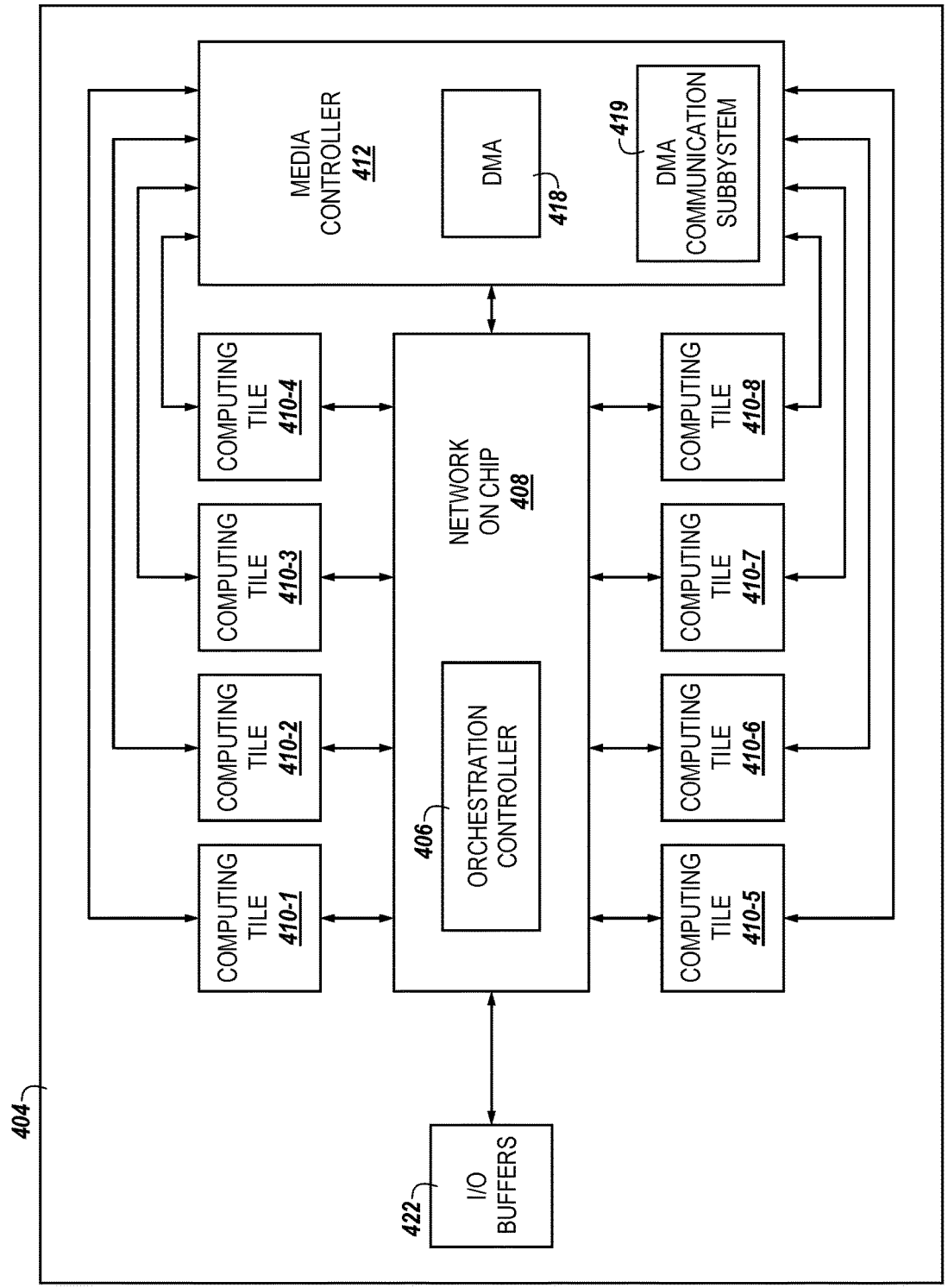
FIG. 4C is yet another functional block diagram in the form of an apparatus including a storage controller in accordance with a number of embodiments of the present disclosure.

FIGS. 4A-4C illustrate various examples of a functional block diagram in the form of an apparatus including a storage controller 404 in accordance with a number of embodiments of the present disclosure. In FIGS. 4A-4C, a media controller 412 is in communication with a plurality of computing tiles 410, a NoC 408, and an orchestration controller 406, which is communication with input/output (I/O) buffers 422. Although eight (8) discrete computing tiles 410 are shown in FIGS. 4A-4C, it will be appreciated that embodiments are not limited to a storage controller 404 that includes eight discrete computing tiles 410. For example, the storage controller 404 can include one or more computing tiles 410, depending on characteristics of the storage controller 404 and/or overall system in which the storage controller 404 is deployed.

As shown in FIGS. 4A-4C, the media controller 412 can include a direct memory access (DMA) component 418 and a DMA communication subsystem 419. The DMA 418 can facilitate communication between the media controller 418 and memory device(s), such as the memory devices 116-1, . . . , 116-N illustrated in FIG. 1, coupled to the storage controller 404 independent of a central processing unit of a host, such as the host 102 illustrated in FIG. 1. The DMA communication subsystem 419 can be a communication subsystem such as a crossbar ("XBAR"), a network on a chip, or other communication subsystem that allows for interconnection and interoperability between the media controller 412, the storage device(s) coupled to the storage controller 404, and/or the computing tiles 410.

In some embodiments, the NoC 408 can facilitate visibility between respective address spaces of the computing tiles 410. For example, each computing tile 410-1, . . . , 410-8 can, responsive to receipt of data and/or a file, store the data in a memory resource (e.g., in the computing tile memory 548 or the computing tile memory 638 illustrated in FIGS. 5 and 6, herein) of the computing tile 410. The computing tiles 410 can associate an address (e.g., a physical address) corresponding to a location in the computing tile 410 memory resource in which the data is stored. In addition, the computing tile 410 can parse (e.g., break) the address associated with the data into logical blocks.

In some embodiments, the zeroth logical block associated with the data can be transferred to a processing device (e.g., the reduced instruction set computing (RISC) device 536 or the RISC device 636 illustrated in FIGS. 5 and 6, herein). A particular computing tile (e.g., computing tile 410-2) can be configured to recognize that a particular set of logical addresses are accessible to that computing tile 410-2, while other computing tiles (e.g., computing tile 410-3, 410-4, etc.) can be configured to recognize that different sets of logical addresses are accessible to those computing tiles 410. Stated alternatively, a first computing tile (e.g., the computing tile 410-2) can have access to a first set of logical addresses associated with that computing tile 410-2, and a second computing tile (e.g., the computing tile 410-3) can have access to a second set of logical address associated therewith, etc.

If data corresponding to the second set of logical addresses (e.g., the logical addresses accessible by the second computing tile 410-3) is requested at the first computing tile (e.g., the computing tile 410-2), the NoC 408 can facilitate communication between the first computing tile (e.g., the computing tile 410-2) and the second computing tile (e.g., the computing tile 410-3) to allow the first computing tile (e.g., the computing tile 410-2) to access the data corresponding to the second set of logical addresses (e.g., the set of logical addresses accessible by the second computing tile 410-3). That is, the NoC 408 can facilitate communication between the computing tiles 410 to allows address spaces of the computing tiles 410 to be visible to one another.

In some embodiments, communication between the computing tiles 410 to facilitate address visibility can include receiving, by an event queue (e.g., the event queue 532 and 632 illustrated in FIGS. 5 and 6) of the first computing tile (e.g., the computing tile 410-1), a message requesting access to the data corresponding to the second set of logical addresses, loading the requested data into a memory resource (e.g., the computing tile memory 538 and 638 illustrated in FIGS. 5 and 6, herein) of the first computing tile, and transferring the requested data to a message buffer (e.g., the message buffer 534 and 634 illustrated in FIGS. 5 and 6, herein). Once the data has been buffered by the message buffer, the data can be transferred to the second computing tile (e.g., the computing tile 410-2) via the NoC 408.

For example, during performance of an extended memory operation, the orchestration controller 406 and/or a first computing tile (e.g., the computing tile 410-1) can determine that the address specified by a host command (e.g., a command to initiate performance of an extended memory operation generated by a host such as the host 102 illustrated in FIG. 1) corresponds to a location in a memory resource of a second computing tile (e.g., the computing tile 410-2) among the plurality of computing tiles 410. In this case, a computing tile command can be generated and sent from the orchestration controller 406 and/or the first computing tile 410-1 to the second computing tile 410-2 to initiate performance of the extended memory operation using an operand stored in the memory resource of the second computing tile 410-2 at the address specified by the computing tile command.

In response to receipt of the computing tile command, the second computing tile 410-2 can perform the extended memory operation using the operand stored in the memory resource of the second computing tile 410-2 at the address specified by the computing tile command. This can reduce command traffic from between the host and the storage controller and/or the computing tiles 410, because the host need not generate additional commands to cause performance of the extended memory operation, which can increase overall performance of a computing system by, for example reducing a time associated with transfer of commands to and from the host.

In some embodiments, the orchestration controller 406 can determine that performing the extended memory operation can include performing multiple sub-operations. For example, an extended memory operation may be parsed or broken into two or more sub-operations that can be performed as part of performing the overall extended memory operation. In this case, the orchestration controller 406 and/or the NoC 408 can utilize the above described address visibility to facilitate performance of the sub-operations by various computing tiles 410. In response to completion of the sub-operation, the orchestration controller 406 can cause the results of the sub-operations to be coalesced into a single result that corresponds to a result of the extended memory operation.

In other embodiments, an application requesting data that is stored in the computing tiles 410 can know which computing tiles 410 include the data requested. In this example, the application can request the data from the relevant computing tile 410 and/or the address may be loaded into multiple computing tiles 410 and accessed by the application requesting the data via the NoC 408.

As shown in FIG. 4A, the orchestration controller 406 comprises discrete circuitry that is physically separate from the NoC 408. The NoC 408 can be a communication subsystem that is provided as one or more integrated circuits that allows communication between the computing tiles 410, the media controller 412, and/or the orchestration controller 406. Non-limiting examples of a NoC 408 can include a XBAR or other communications subsystem that allows for interconnection and/or interoperability of the orchestration controller 406, the computing tiles 410, and/or the media controller 412.

As described above, responsive to receipt of a command generated by the orchestration controller 406, the NoC 408, and/or a host (e.g., the host 102 illustrated in FIG. 1) performance of extended memory operations using data stored in the computing tiles 410 and/or from blocks of data streamed through the computing tiles 410 can be realized.

As shown in FIG. 4B, the orchestration controller 406 is resident on one of the computing tiles 410-1 among the plurality of computing tiles 410-1, . . . , 410-8. As used herein, the term "resident on" refers to something that is physically located on a particular component. For example, the orchestration controller 406 being "resident on" one of the computing tiles 410 refers to a condition in which the orchestration controller 406 is physically coupled to a particular computing tile. The term "resident on" may be used interchangeably with other terms such as "deployed on" or "located on," herein.

As described above, responsive to receipt of a command generated by the computing tile 410-1/orchestration controller 406, the NoC 408, and/or a host, performance of extended memory operations using data stored in the computing tiles 410 and/or from blocks of data streamed through the computing tiles 410 can be realized.

As shown in FIG. 4C, the orchestration controller 406 is resident on the NoC 408. In some embodiments, providing the orchestration controller 406 as part of the NoC 408 results in a tight coupling of the orchestration controller 406 and the NoC 408, which can result in reduced time consumption to perform extended memory operations using the orchestration controller 406.

As described above, responsive to receipt of a command generated by the orchestration controller 406, the NoC 408, and/or a host, performance of extended memory operations using data stored in the computing tiles 410 and/or from blocks of data streamed through the computing tiles 410 can be realized.

FIG. 5 is a block diagram in the form of a computing tile 510 in accordance with a number of embodiments of the present disclosure. As shown in FIG. 5, the computing tile 510 can include queueing circuitry, which can include a system event queue 530 and/or an event queue 532, and a message buffer 534 (e.g., outbound buffering circuitry). The computing tile 510 can further include a processing device (e.g., a processing unit) such as a reduced instruction set computing (RISC) device 536, a computing tile memory 538 portion, and a direct memory access buffer 539 (e.g., inbound buffering circuitry). The RISC device 536 can be a processing resource that can employ a reduced instruction set architecture (ISA) such as a RISC-V ISA, however, embodiments are not limited to RISC-V ISAs and other processing devices and/or ISAs can be used. The RISC device 536 may be referred to for simplicity as a "processing unit." In some embodiments, the computing tile 510 shown in FIG. 5 can function as an orchestration controller (e.g., the orchestration controller 106/206/306/406 illustrated in FIGS. 1-4, herein).

The system event queue 530, the event queue 532, and the message buffer 534 can be in communication with an orchestration controller such as the orchestration controller 106, 206, 306, and 406 illustrated in FIGS. 1-4, respectively. In some embodiments, the system event queue 530, the event queue 532, and the message buffer 534 can be in direct communication with the orchestration controller, or the system event queue 530, the event queue 532, and the message buffer 534 can be in communication with a network on a chip such as the NoC 108, 208, and 308 illustrated in FIGS. 1-3, respectively, which can further be in communication with the orchestration controller and/or a host, such as the host 102 illustrated in FIG. 1.

The system event queue 530, the event queue 532, and the message buffer 534 can receive messages and/or commands from the orchestration controller and/or the host, and/or can send messages and/or commands to the orchestration controller and/or the host to control operation of the computing tile 510 to perform extended memory operations on data (e.g., blocks of data 211 and 311 illustrated in FIGS. 2 and 3, herein) that are stored by the computing tile 510. In some embodiments, the commands and/or messages can include messages and/or commands to allocate or de-allocate resources available to the computing tile 510 during performance of the extended memory operations. In addition, the commands and/or messages can include commands and/or messages to synchronize operation of the computing tile 510 with other computing tiles deployed in a storage controller (e.g., the storage controller 104, 204, 304, and 404 illustrated in FIG. 1-4, respectively).

For example, the system event queue 530, the event queue 532, and the message buffer 534 can facilitate communication between the computing tile 510, the orchestration controller, and/or the host to cause the computing tile 510 to perform extended memory operations using data stored in the computing tile memory 538. In a non-limiting example, the system event queue 530, the event queue 532, and the message buffer 534 can process commands and/or messages received from the orchestration controller and/or the host to cause the computing tile 510 to perform an extended memory operation on the stored data and/or an address corresponding to a physical address within the computing tile memory 538 in which the data is stored. This can allow for an extended memory operation to be performed using the data stored in the computing tile memory 538 prior to the data being transferred to circuitry external to the computing tile 510 such as the orchestration controller, a NoC, or a host (e.g., the host 102 illustrated in FIG. 1, herein).

The system event queue 530 can receive interrupt messages from the orchestration controller or NoC. The interrupt messages can be processed by the system event queue 532 to cause a command or message sent from the orchestration controller, the host, or the NoC to be immediately executed. For example, the interrupt message(s) can instruct the system event queue 532 to cause the computing tile 510 to abort operation of pending commands or messages and instead execute a new command or message received from the orchestration controller, the host, or the NoC. In some embodiments, the new command or message can involve a command or message to initiate an extended memory operation using data stored in the computing tile memory 538.

The event queue 532 can receive messages that can be processed serially. For example, the event queue 532 can receive messages and/or commands from the orchestration controller, the host, or the NoC and can process the messages received in a serial manner such that the messages are processed in the order in which they are received. Non-limiting examples of messages that can be received and processed by the event queue can include request messages from the orchestration controller and/or the NoC to initiate processing of a block of data (e.g., a remote procedure call on the computing tile 510), request messages from other computing tiles to provide or alter the contents of a particular memory location in the computing tile memory 538 of the computing tile that receives the message request (e.g., messages to initiate remote read or write operations amongst the computing tiles), synchronization message requests from other computing tiles to synchronize performance of extended memory operations using data stored in the computing tiles, etc.

The message buffer 534 can comprise a buffer region to buffer data to be transferred out of the computing tile 510 to circuitry external to the computing tile 510 such as the orchestration controller, the NoC, and/or the host. In some embodiments, the message buffer 534 can operate in a serial fashion such that data (e.g., a result of an extended memory operation) is transferred from the buffer out of the computing tile 510 in the order in which it is received by the message buffer 534. The message buffer 534 can further provide routing control and/or bottleneck control by controlling a rate at which the data is transferred out of the message buffer 534. For example, the message buffer 534 can be configured to transfer data out of the computing tile 510 at a rate that allows the data to be transferred out of the computing tile 510 without creating data bottlenecks or routing issues for the orchestration controller, the NoC, and/or the host.

The RISC device 536 can be in communication with the system event queue 530, the event queue 532, and the message buffer 534 and can handle the commands and/or messages received by the system event queue 530, the event queue 532, and the message buffer 534 to facilitate performance of operations on the stored by, or received by, the computing tile 510. For example, the RISC device 536 can include circuitry configured to process commands and/or messages to cause performance of extended memory operations using data stored by, or received by, the computing tile 510. The RISC device 536 may include a single core or may be a multi-core processor.

The computing tile memory 538 can, in some embodiments, be a memory resource such as random-access memory (e.g., RAM, SRAM, etc.). Embodiments are not so limited, however, and the computing tile memory 538 can include various registers, caches, buffers, and/or memory arrays (e.g., 1T1C, 2T2C, 3T, etc. DRAM arrays). The computing tile memory 538 can be configured to receive and store data from, for example, a memory device such as the memory devices 116-1, . . . , 116-N illustrated in FIG. 1, herein. In some embodiments, the computing tile memory 538 can have a size of approximately 256 kilobytes (KB), however, embodiments are not limited to this particular size, and the computing tile memory 538 can have a size greater than, or less than, 256 KB.

The computing tile memory 538 can be partitioned into one or more addressable memory regions. As shown in FIG. 5, the computing tile memory 538 can be partitioned into addressable memory regions so that various types of data can be stored therein. For example, one or more memory regions can store instructions ("INSTR") 541 used by the computing tile memory 538, one or more memory regions can store data 543-1, . . . , 543-N, which can be used as an operand during performance of an extended memory operation, and/or one or more memory regions can serve as a local memory ("LOCAL MEM.") 545 portion of the computing tile memory 538. Although twenty (20) distinct memory regions are shown in FIG. 5, it will be appreciated that the computing tile memory 538 can be partitioned into any number of distinct memory regions.

As discussed above, the data can be retrieved from the memory device(s) and stored in the computing tile memory 538 in response to messages and/or commands generated by the orchestration controller (e.g., the orchestration controller 106, 206, 306, 406 illustrated in FIGS. 1-4, herein), and/or a host (e.g., the host 102 illustrated in FIG. 1, herein). In some embodiments, the commands and/or messages can be processed by a media controller such as the media controller 112, 212, 312, or 412 illustrated in FIGS. 1-4, respectively. Once the data are received by the computing tile 510, they can be buffered by the DMA buffer 539 and subsequently stored in the computing tile memory 538.

As a result, in some embodiments, the computing tile 510 can provide data driven performance of operations on data received from the memory device(s). For example, the computing tile 510 can begin performing operations on data (e.g., extended memory operations, etc.) received from the memory device(s) in response to receipt of the data.

For example, because of the non-deterministic nature of data transfer from the memory device(s) to the computing tile 510 (e.g., because some data may take longer to arrive at the computing tile 510 dude to error correction operations performed by a media controller prior to transfer of the data to the computing tile 510, etc.), data driven performance of the operations on data can improve computing performance in comparison to approaches that do not function in a data driven manner.

In some embodiments, the orchestration controller can send a command or message that is received by the system event queue 530 of the computing tile 510. As described above, the command or message can be an interrupt that instructs the computing tile 510 to request a data and perform an extended memory operation on the data. However, the data may not immediately be ready to be sent from the memory device to the computing tile 510 due to the non-deterministic nature of data transfers from the memory device(s) to the computing tile 510. However, once the data is received by the computing tile 510, the computing tile 510 can immediately begin performing the extended memory operation using the data. Stated alternatively, the computing tile 510 can begin performing an extended memory operation on the data responsive to receipt of the data without requiring an additional command or message to cause performance of the extended memory operation from external circuitry, such as a host.

In some embodiments, the extended memory operation can be performed by selectively moving data around in the computing tile memory 538 to perform the requested extended memory operation. In a non-limiting example in which performance of a floating-point add accumulate extended memory operation is requested, an address in the computing tile memory 538 in which data to be used as an operand in performance of the extended memory operation can be added to the data, and the result of the floating-point add accumulate operation can be stored in the address in the computing tile memory 538 in which the data was stored prior to performance of the floating-point add accumulate extended memory operation. In some embodiments, the RISC device 536 can execute instructions to cause performance of the extended memory operation.

As the result of the extended memory operation is transferred to the message buffer 534, subsequent data can be transferred from the DMA buffer 539 to the computing tile memory 538 and an extended memory operation using the subsequent data can be initiated in the computing tile memory 538. By having subsequent data buffered into the computing tile 510 prior to completion of the extended memory operation using the preceding data, data can be continuously streamed through the computing tile in the absence of additional commands or messages from the orchestration controller or the host to initiate extended memory operations on subsequent data. In addition, by preemptively buffering subsequent data into the DMA buffer 539, delays due to the non-deterministic nature of data transfer from the memory device(s) to the computing tile 510 can be mitigated as extended memory operations are performed on the data while being streamed through the computing tile 510.

When the result of the extended memory operation is to be moved out of the computing tile 510 to circuitry external to the computing tile 510 (e.g., to the NoC, the orchestration controller, and/or the host), the RISC device 536 can send a command and/or a message to the orchestration controller and/or the host, which can, in turn send a command and/or a message to request the result of the extended memory operation from the computing tile memory 538.

Responsive to the command and/or message to request the result of the extended memory operation, the computing tile memory 538 can transfer the result of the extended memory operation to a desired location (e.g., to the NoC, the orchestration tile, and/or the host). For example, responsive to a command to request the result of the extended memory operation, the result of the extended memory operation can be transferred to the message buffer 534 and subsequently transferred out of the computing tile 510.

FIG. 6 is another block diagram in the form of a computing tile 610 in accordance with a number of embodiments of the present disclosure. As shown in FIG. 6, the computing tile 610 can include a system event queue 630, an event queue 632, and a message buffer 634. The computing tile 610 can further include an instruction cache 635, a data cache 637, a processing device such as a reduced instruction set computing (RISC) device 636, a computing tile memory 638 portion, and a direct memory access buffer 639. The computing tile 610 shown in FIG. 6 can be analogous to the computing tile 510 illustrated in FIG. 5, however, the computing tile 610 illustrated in FIG. 6 further includes the instruction cache 635 and/or the data cache 637. In some embodiments, the computing tile 610 shown in FIG. 6 can function as an orchestration controller (e.g., the orchestration controller 106/206/306/406 illustrated in FIGS. 1-4, herein).

The instruction cache 635 and/or the data cache 637 can be smaller in size than the computing tile memory 638. For example, the computing tile memory can be approximately 256 KB while the instruction cache 635 and/or the data cache 637 can be approximately 32 KB in size. Embodiments are not limited to these particular sizes, however, so long as the instruction cache 635 and/or the data cache 637 are smaller in size than the computing tile memory 638.

In some embodiments, the instruction cache 635 can store and/or buffer messages and/or commands transferred between the RISC device 636 to the computing tile memory 638, while the data cache 637 can store and/or buffer data transferred between the computing tile memory 638 and the RISC device 636.

FIG. 7 is a flow diagram representing an example method 750 for extended memory operations in accordance with a number of embodiments of the present disclosure. At block 752, the method 750 can include receiving, by a controller coupled to a plurality of computing devices each coupled to one another and that each comprise a processing unit and a memory array configured as a cache for the processing unit, a command to initiate performance of an operation that comprises performing an operation on data with the processing unit of a particular computing device of the plurality of computing devices. The controller tile can be analogous to the orchestration controller 106/206/306/406 illustrated in FIGS. 1-3 and 4A-4C, herein. The computing devices can be analogous to the computing tiles 110/210/310/410/510/610 illustrated in FIGS. 1-, 4A-4C, and 5-6, herein.

In some embodiments, receiving the command to initiate performance of the operation can include receiving an address corresponding to a memory location in the particular computing device in which the operand corresponding to performance of the operation is stored. For example, as described above, the address can be an address in a memory portion (e.g., a computing tile memory such as the computing tile memory 538/638 illustrated in FIGS. 5 and 6, herein) in which data to be used as an operand in performance of an operation is stored.

At block 754, the method 750 can include determining, by the controller, whether the particular computing device among the plurality of computing devices that stores an operand corresponding to the operation indicated by the command. The particular computing device can be analogous to one of the computing tiles 110/210/310/410/510/610 illustrated in FIGS. 1-6, herein.

At block 756, the method 750 can include performing, by the particular computing device, the operation on the data in response to determining that the particular computing devices stores the operand. In some embodiments, performing the operation can include performing an extended memory operation, as described herein. The operation can further include performing, by the particular computing device, the operation in the absence of receipt of a host command from a host coupleable to the controller. In response to completion of performance of the operation, the method 750 can include sending a notification to a host coupleable to the controller.

In some embodiments, the command to initiate performance of the operation can include an address corresponding to a location in the memory array of the particular computing device and the method 750 can include storing a result of the operation in the address corresponding to the location in the particular computing device. For example, the method 750 can include storing a result of the operation in the address corresponding to the memory location in the particular computing device in which the operand corresponding to performance of the operation was stored prior to performance of the extended memory operation. That is, in some embodiments, a result of the operation can be stored in the same address location of the computing device in which the data that was used as an operand for the operation was stored prior to performance of the operation.

In some embodiments, the method 750 can include determining, by the controller, that the operand corresponding to performance of the operation is not stored by the particular computing tile. In response to such a determination, the method 750 can further include determining, by the controller, that the operand corresponding to performance of the operation is stored in a memory device coupled to the plurality of computing devices. The method 750 can further include retrieving the operand corresponding to performance of the operation from the memory device, causing the operand corresponding to performance of the operation to be stored in at least one computing device among the plurality of computing device, and/or causing performance of the operation using the at least one computing device. The memory device can be analogous to the memory devices 116 illustrated in FIG. 1.

The method 750 can, in some embodiments, further include determining that at least one sub-operation is to be performed as part of the operation, sending a command to a computing device different than the particular computing device to cause performance of the sub-operation, and/or performing, using the computing device different than the particular computing device, the sub-operation as part of performance of the operation. For example, in some embodiments, a determination that the operation is to be broken into multiple sub-operations can be made and the controller can cause different computing devices to perform different sub-operations as part of performing the operation. In some embodiments, the orchestration controller can, in concert with a communications subsystem, such as the NoC 108/208/308/408 illustrated in FIGS. 1-4, herein, assign sub-operations to two or more of the computing devices as part of performance of the operation.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a plurality of memory devices; and
a storage controller coupled to the plurality of memory devices and comprising:
  a processing device;
  a memory resource configured as a cache for the processing device; and
  circuitry to access the plurality of memory devices, wherein the storage controller is configured to:
    transfer, responsive to a determination that a first block of data has been transferred from at least one of the plurality of memory devices to the memory resource, a second block of data to a buffer resident on the storage controller in the absence of a command separate from signaling corresponding to performance of an operation involving the first block of data and an operand written to the memory resource;
    transfer, responsive to completion of the operation that involves the first block of data and the operand written to the memory resource, the second block of data to the memory resource; and
    perform, in the absence of receipt of intervening signaling from circuitry external to the storage controller and responsive to the second block of data being transferred to the memory resource, an operation involving the second block of data and the operand written to the memory resource.

2. The apparatus of claim 1, wherein the signaling corresponding to performance of the operation using the processing unit of the storage controller includes a command comprising at least one of:
an address portion corresponding to an address in the memory resource in which a operand involved in the operation is stored,
a segment size portion corresponding to an amount of data processible by the processing device, or
a length portion corresponding to an amount of data in the first block of data or the second block of data, or any combination thereof.

3. The apparatus of claim 1, wherein the storage controller is to perform the operation involving the second block of data and the operand written to the memory resource in the absence of receipt of signaling to load the operand or store the operand in the memory resource.

4. The apparatus of claim 1, wherein the storage controller is to perform the operation involving the first block of data and the operand written to the memory resource in the absence of receipt of intervening signaling from circuitry external to the storage controller.

5. The apparatus of claim 1, further comprising a different processing device coupled to the processing device, wherein the processing device is to:
determine that the operand is not written to the memory resource that is configured as the cache for the processing device;
responsive to the determination that the operand is not stored in the memory resource that is configured as the cache for the processing device, determine that the operand is stored in a memory resource that is configured a cache for the different processing device;
send signaling to the different processing device to initiate performance of the operation using the operand stored in the memory resource of the different processing device; and
perform, by the different processing device, the operation using the operand stored in the memory resource that is configured a cache for the different processing device.

6. The apparatus of claim 1, wherein the storage controller is configured to store a result of the operation in an address location of the memory resource in which the operand was stored prior to performance of the operation.

7. A method, comprising:
transferring, by a storage controller that comprises a plurality of computing devices that each comprise a processing device and a memory resource configured as a cache for the processing device, a block of data to a buffer resident on the storage controller responsive to a determination that a preceding block of data has been transferred from a memory device couplable to the storage controller to the memory resource;
transferring, responsive to completion of an operation that involves the preceding block of data and an operand written to the memory resource, the block of data to the memory resource; and performing, in the absence of receipt of intervening signaling from circuitry external to the storage controller and responsive to the block of data being transferred to the memory resource, an operation involving the block of data and the operand written to the memory resource.

8. The method of claim 7, further comprising transferring the block of data to the buffer in the absence of signaling separate from signaling corresponding to performance of an operation involving the preceding block of data and the operand written to the memory resource.

9. The method of claim 7, further comprising writing a result of the operation in an address location of the memory resource in which the operand was stored prior to performance of the operation.

10. The method of claim 7, further comprising performing the operation involving the block of data and the operand written to the memory resource in the absence of receipt of signaling to load the operand or store the operand in the memory resource.

11. The method of claim 7, further comprising performing the operation involving the preceding block of data and the operand written to the memory resource in the absence of receipt of intervening signaling from circuitry external to the storage controller.

12. The method of claim 7, further comprising:
determining that at least one sub-operation is to be performed as part of the operation that involves the preceding block of data or the operation that involves the block of data, or both; and
performing, using at least of the plurality of computing devices, the sub-operation as part of performance of the operation.

13. The method of claim 7, further comprising sending a notification to a host couplable to the plurality of computing devices in response to completion of the operation that involves the preceding block of data or the operation that involves the block of data, or both.

14. A system, comprising:
a memory device; and
a storage controller configured to facilitate access to the memory device, wherein the storage controller comprises a plurality of computing devices coupled to a sub-controller and a communication subsystem, wherein each computing device comprises a respective memory resource and a respective processing unit;
a memory resource; and
circuitry to perform read operations, or write operations, or copy operations, or any combination thereof involving the plurality of memory devices, wherein the plurality of computing devices and the circuitry are on a same integrated circuit,
and wherein a particular computing device among the plurality of computing devices is to:
receive signaling indicative of performance of an operation using the processing unit of the first computing device, wherein the signaling specifies an address associated with a memory resource corresponding to the particular computing device among the plurality of computing devices and an operand for use in performance of the operation;
transfer, responsive to the determination that the operand corresponding to the operation is stored in the memory resource, the circuitry to transfer a first block of data from the memory device to the memory resource;
transfer, responsive to a determination that the first block of data has been transferred from the one or more memory devices to the memory resource, a second block of data to be transferred to a buffer resident on the storage controller;
perform the operation using the operand and the first block of data; and
cause, responsive to completion of the operation using the operand and the first block of data, the second block of data to be transferred to the memory resource.

15. The system of claim 14, wherein the particular computing device is to perform, in the absence of receipt of an intervening command from circuitry external to the storage controller and responsive to the second block of data being transferred to the memory resource, an operation using the second block of data and the operand.

16. The system of claim 14, wherein the particular computing device is to store a result of the operation using the operand and the first block of data in the location specified by the address associated with the memory resource.

17. The system of claim 14, wherein the particular computing device is to:
determine that the location specified by the address associated with the memory resource corresponds to a location in a memory resource of a different computing device among the plurality of computing devices;
send a command to the different computing device to initiate performance of the operation using an operand stored in the memory resource of the second computing device at an address by the command; and
perform, using the different computing device, an operation using the operand stored in the memory resource of the second computing device at the address specified by the command.

18. The system of claim 17, wherein the different computing device is to perform the operation in the absence of a command subsequent to the command.

19. The system of claim 14, wherein the particular computing device is to:
determine that at least one sub-operation is to be performed as part of the operation;
send a command to a different computing device among the plurality of computing devices to cause performance of the sub-operation; and
perform, using the different computing device, the sub-operation as part of performance of the operation.

20. The system of claim 19, wherein the different computing device is to send a result of the sub-operation to the particular computing device, and wherein the particular computing device is to use the result of the sub-operation in performance of the operation.

* * * * *